UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

PYROXYLIN COMPOSITION.

1,147,850.

Specification of Letters Patent.

Patented July 27, 1915.

No Drawing.

Application filed September 18, 1907. Serial No. 393,532.

*To all whom it may concern:*

Be it known that I, CARLETON ELLIS, a citizen of the United States, and a resident of Larchmont, in the county of Westchester and State of New York, have invented certain new and useful Improvements in Pyroxylin Compositions, of which the following is a specification.

This invention relates to paint and varnish removers carrying as an essential solvent an organic acid and a cellulose compound, such as pyroxylin.

Ordinary pyroxylin is soluble in acetic acid, and the solution produced may be thrown into a gelatinous condition by the addition of a hydrocarbon, such as benzol, in which the pyroxylin is not soluble. It is, of course, evident that such additions of hydrocarbon can be carried only to a certain point. To maintain the pyroxylin in a gelatinous state a relatively large amount of the hydrocarbon is generally needed. Too large an amount of hydrocarbon will completely precipitate the pyroxylin. It is, therefore, necessary to adjust the relative proportions of the ingredients so as to preserve the pyroxylin in the desired state of gelatinization.

A formula illustrative of my invention consists of 5 parts pyroxylin dissolved in 20 parts of glacial acetic acid, to which is added after the solution of pyroxylin is complete an equal volume of benzol. Other acids, particularly when concentrated, such for example as formic, propionic, butyric and the like, carbolic acid, particularly when used in conjunction with acetic acid make useful solvents for the pyroxylin. The solubility of the pyroxylin may be increased by the addition of moderate amounts of wood alcohol or denatured alcohol, acetone, methyl ketone, adipin ketone, amyl alcohol, amyl acetate, sulfuric ether and the like. Many other organic bodies act similar to benzol, particularly the homologues of benzol, toluol, xylol, the light hydrocarbons of petroleum, terpenes, such as spirits of turpentine, terpineol, resin spirits, chlorid of carbon, such as carbon tetrachlorid and the like.

Fillers of various descriptions may be added, such as ordinary flour, Irish moss, starch, sugar, etc., wood flour, saw-dust, Peruvian bark refuse, peat, tan-bark and the like; infusorial earth and other mineral flours, sulfonated oils and greases, waxes, crystallized organic bodies, such as naphthalene or camphor and various inorganic salts of a watery soluble character.

The composition is particularly useful in the removal of paint.

This invention has been described in connection with a number of illustrative ingredients, formulas, proportions and processes, to the details of which disclosure the invention is not, of course, to be limited.

What is claimed is:—

1. The substantially fluent finish remover comprising pyroxylin dissolved in glacial acetic acid, incorporated carbolic acid, acetone, benzol and wax.

2. The substantially fluent finish remover comprising pyroxylin, a volatile fatty acid solvent therefor, phenolic material, incorporated composite organic finish solvent material and wax.

3. The finish remover comprising nitrated cellulose, a volatile organic acid solvent therefor, incorporated composite volatile finish solvent material including an aromatic hydrocarbon and wax.

4. The finish remover comprising nitrated cellulose dissolved in organic acid solvent therefor, incorporated finish softening material comprising an aromatic hydrocarbon and waxy thickening material.

5. The finish remover comprising nitrated cellulose, an acid solvent therefor, incorporated organic finish softening material comprising a hydrocarbon solvent and waxy thickening material.

6. The finish remover comprising nitrated cellulose, an organic acid solvent therefor, incorporated finish solvent material comprising a hydrocarbon and waxy thickening material.

7. The finish remover comprising nitrated cellulose, an acid solvent therefor, incorporated volatile organic finish softening material and waxy thickening material.

8. The finish remover comprising nitrated cellulose, an acid solvent therefor, incorporated finish softening material and waxy film forming thickening material.

Signed at Larchmont in the county of Westchester and State of New York this 14th day of Sept., A. D. 1907.

CARLETON ELLIS.

Witnesses:
 THEODORE ELLIS,
 BRIDELLA M. ELLIS.